United States Patent Office 3,204,771
Patented Sept. 7, 1965

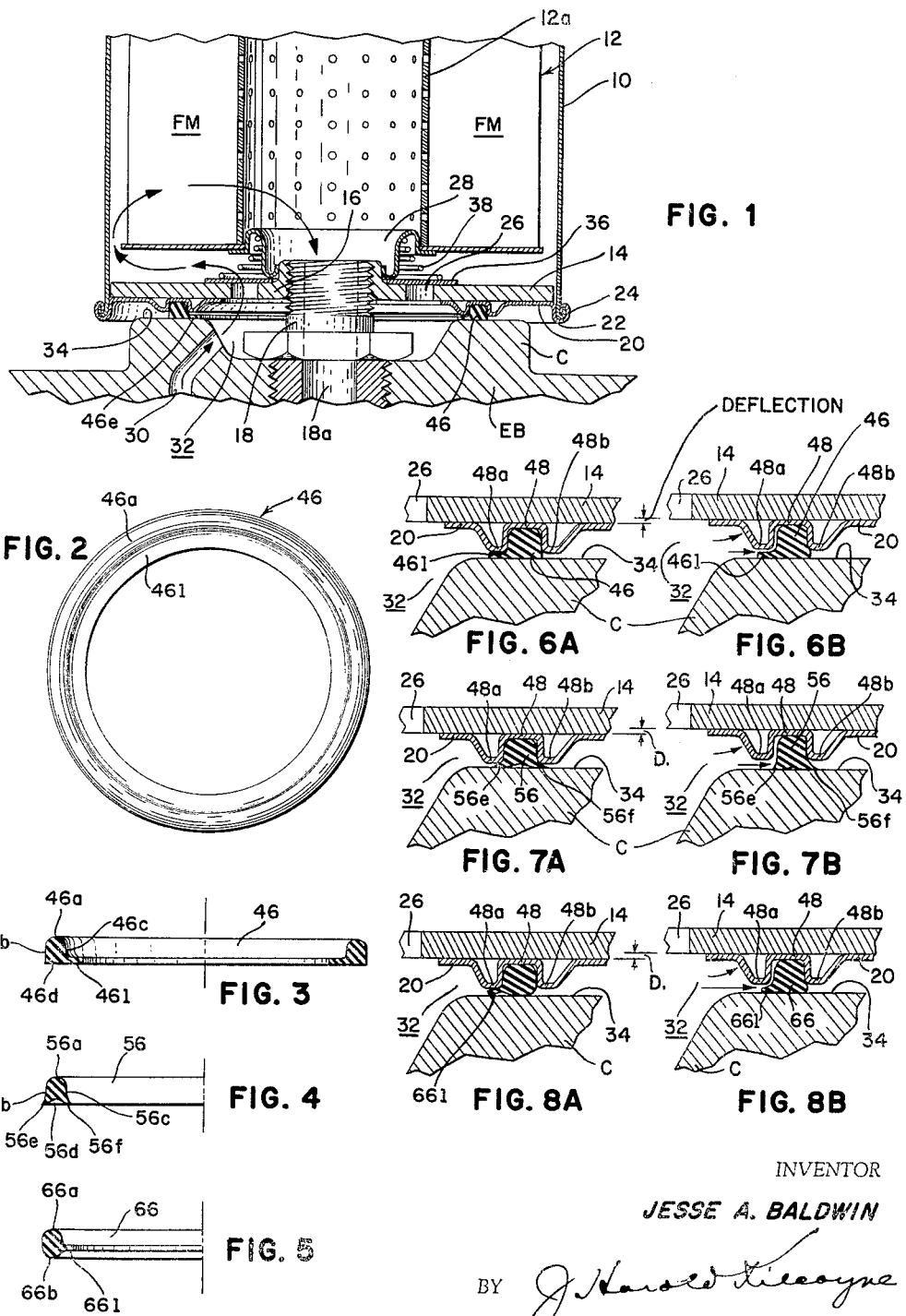

3,204,771
OIL FILTER SEAL
Jesse A. Baldwin, Kearney, Nebr., assignor to J. A. Baldwin Manufacturing Company, Kearney, Nebr., a corporation of Wisconsin
Filed Mar. 28, 1962, Ser. No. 183,277
3 Claims. (Cl. 210—443)

This invention relates to improvements in oil filter sealing means, and is more particularly directed to an improved means for sealing the base structure of an oil filter of the throwaway type to an engine block surface to which the throwaway oil filter conventionally attaches by means of a screw-on form of attachment.

While it was earlier thought that a heavy, rigid base construction was essential to the properly designed and operative throwaway filter, more recently it has come to be recognized, as has been disclosed in co-pending (but now abandoned) application Serial No. 79,733, filed December 30, 1960, by Robert A Schroeder and myself jointly, that base plate construction need not satisfy the requirements of extreme strength and rigidity, since some base plate deflection was not only inevitable because of engine vibration, shocks encountered in sudden stops and starts, etc., but also was even permissable provided that the sealing means employed to seal the filter base to the engine block or filter-mounting casting provided thereon was as effective under abnormal operating conditions as aforesaid as under the more normal conditions. Based on this new concept, the trend in throwaway filter design is now away from the extremely heavy and rigid filter-base construction which was previously considered necessary to good throwaway filter design, and towards a form of sealing means which is effective under all of the various operating conditions to which the throwaway oil filter is subjected in normal automotive use.

In line with this trend, the present invention contemplates and has for its principal object the provision of improved sealing means for sealing a throwaway-type filter whose base plate may be subject to some limited deflection, to the engine block or casting to which the filter normally mounts, characterized by its ability to provide in effect a double-acting seal serving to positively seal off any leakage of oil under both normal and abnormal operating conditions to which the filter may be subjected in use thereof.

A more particular object of the invention is to improve the sealing action of the O-ring type of seal or gasket as disclosed in the aforesaid Baldwin and Schroeder application Serial No. 79,733.

Yet another object of the invention is the provision of a sealing means for sealing a throwaway oil filter to the engine block or casting surface to which the filter mounts, which is so constructed and arranged that it provides substantially increased sealing area as compared to the O-ring type seal or gasket of the more conventional configuration.

Yet another object of the invention is the provision of a modified O-ring gasket type of sealing means for sealing throwaway filters to the engine block surface or casting to which such filters directly mount, characterized in that the gasket proper is provided with an internally directed lip or lip-forming means which combines with the ring body of the gasket in effectively sealing the filter base to the engine block or casting not only under normal conditions, but also and equally importantly, by providing increased sealing area, renders the gasket highly effective in performing its sealing properties under adverse or abnormal conditions causing base plate deflection.

The above and other objects of the improved filter-to-engine block or casting sealing means according to the present invention will appear from the following detailed description and accompanying drawings illustrative of various forms which the improved sealing means may take, in which:

FIG. 1 is a fragmentary part-sectional elevation view of a throwaway filter incorporating one form of improved filter-to-engine block sealing means according to the present invention;

FIG. 2 is a plan view of the sealing gasket employed in the sealing means shown in FIG. 1;

FIG. 3 is a transverse medial section taken through the sealing ring or gasket shown in FIG. 2;

FIG. 4 is a quarter section illustrating a somewhat different configuration of sealing ring than is shown in FIG. 3;

FIG. 5 is a view similar to FIG. 4 which illustrates yet another shape or configuration of sealing ring according to the invention;

FIG. 6A is an enlarged detailed view in section taken through the sealing ring according to the FIGS. 2 and 3 form, which illustrates its normal action in providing an oil-tight seal between the base of a throwaway filter and the plane mounting surface of the engine block to which said filter mounts;

FIG. 6B is a view similar to FIG. 6A, but illustrating the action of the O-ring sealing means or gasket of the invention in providing a positive seal between the filter base and engine block or casting surface even under conditions of base plate deflection as tends to break or destroy the oil seal;

FIGS. 7A and 7B are views similar to FIGS. 6A and 6B, which illustrate the sealing action of the O-ring according to the sectional shape or configuration thereof, as illustrated in FIG. 4; and, FIGS. 8A and 8B are again views similar to FIGS. 6A and 6B, which illustrate the action of the FIG. 5 form of modified O-ring or gasket in providing an effective seal both under the normal and base-plate deflecting conditions.

The improved throwaway filter sealing means according to the present invention will be described in the following as applied to a filter comprising a preferably drawn shell or bowl 10 of inverted, cup-shaped configuration fashioned from thin sheet metal, a unitary annular filter element or cartridge 12 contained within the shell, and a base structure closing the bottom end of the shell. Illustratively, such base structure includes as its principal structural element a circular disc-form plate 14 of moderately heavy-gauge steel sheet which is formed in its central portion with an axially-inwardly directed tubular neck 16 whose bore is provided with internal threads, whereby the base plate, and thereby the filter as a whole, may be screwed onto the upper, externally threaded end of a tubular mounting stud 18 whose bore 18a provides the oil outlet passage from filter to engine block designated EB. Illustratively, the mounting stud 18 may take the form of an adapter bushing which is threaded externally at both its ends and is further provided in its intermediate portion with a hexnut formation whereby its lower end may be screw-threaded to said engine block (or filter base casting), which is of course apertured and tapped to receive same, as by means of a conventional wrench.

The aforesaid base structure also comprises a filter-base cover plate 20 of relatively thin metal, which is formed along its outer periphery with a depending flange 22 which is double lock-seamed as at 24 to the bottom edge of the filter shell 10, it being observed that the double lock-seam is disposed well below the peripheral edge of the base plate 14. Said cover plate 20 is of annular form and terminates along its inner edge well short (i.e. radially outwardly) of the tubular neck 16 and thus in non-covering relation with respect to a plurality of oil-inlet openings 26 provided in the base plate proper and which are preferably arranged in circular series about said neck 16.

The aforesaid filter element 12 is conventional and, as will be seen from FIG. 1, it is supported within the filter shell or bowl 10 by its coaction with a ferrule-type adapter bushing 28 constituting a component of oil-inlet and anti-drainback means to be generally described hereinafter. When assembled within its shell, the aforesaid filter element 12 is biased in downward direction against said adapter bushing 28 by a stiff coil spring operative between the upper end of the shell and the upper end of the filter element, as is conventional.

Dirty oil from the engine enters the shell 10 of the filter via engine block passage 30 which as seen in FIG. 1 opens into an annular well 32 extending about the filter-mounting stud 18 and which is defined outwardly by a raised annular boss-like casting C formed on the engine block and having a plane top surface 34 against which the filter is adapted to seat, and thence through the oil inlet openings 26 provided in the base plate 14. As indicated by the flow-path arrows, the entering oil flows axially, outwardly and thence upwardly along the length of the filter element 12, and thence radially-inwardly through the filtering media FM making up said element to the perforated tube 12a with which the latter is conventionally provided. Being cleaned in its passage through the filtering media, the cleaned oil flows axially-downwardly through said center tube, then outwardly from the filter through the bore 18a of the tubular mounting stud 18, and thence back to the oil lubricating circuit of the engine. The illustrated filter is of the so-called full-flow type and hence it will be provided with a normally closed relief valve (not shown) at the upper end of the filter element which opens into the center tube 12a of the latter, thereby enabling oil to by-pass the filter element when, for example, due to a cold engine the oil does not readily flow through the filter element, or when the filter element becomes completely loaded. However, it will be understood that in part-flow and in Diesel-engine type filters, the aforesaid by-pass valve is omitted as it is not required.

The aforesaid oil-inlet and anti-drainback valve means is preferably of the type comprising a rubber or synthetic rubber annulus 36 which is secured along its inner edge to and is further normally held flat against the upper face of the filter base plate 14 and thus in closing relation with respect to the oil-inlet openings 26 provided in said plate by means, respectively, of the aforesaid adapter bushing 28 and the larger-diameter end of a light helical coil spring 38 whose smaller-dimeter upper end is held by the upper end of said adapter bushing. The aforesaid arrangement is thus one in which the valve annulus 36 can normally open against the bias of the light helical spring 38 effective against its outer edge zone, but will automatically close against the upper face of the base plate, thus to cut off return oil flow through said oil-inlet openings, during periods when the engine is not in operation or the oil pressure within the system has become lost.

In common with the filter base-structure disclosed and claimed in the aforesaid Baldwin et al. application Serial No. 79,733, the filter base-structure of the present invention also incorporates means for sealing the filter as a whole to the engine block, when screwed thereto. According to the instant invention, such means broadly comprises a modified O-ring type sealing gasket 46 (to be hereinafter described in detail) seated in a relatively downwardly-opening annular groove 48 provided therefor in the aforesaid (base) cover plate 20 and which, illustratively is defined by two radially spaced, circular ribs 48a, 48b pressed into said cover plate from above to a depth that their apical edges extend downwardly past the general plane of the base structure (excepting for its seamed outer peripheral edge) and being further located intermediate said outer edge and the inner edge of said cover plate. It will of course be understood that the groove 48 will overlie the engine block mounting surface 34 and hence its diameter will be appreciably greater than the largest diameter of said oil flow chamber 32. Also in common with the conventional O-ring type gasket disclosed in the aforesaid application Serial No. 79,733, the diameter of the herein proposed modified O-ring gasket 46 is such that it is slightly compressed laterally when inserted into said groove 48 and thus by having a squeeze fit in said groove it secures itself therein by friction, with the advantage that no additional or extraneous means for securing the sealing gasket in place on the cover plate 20 is required. Furthermore, the axial dimension of the modified gasket 46 is greater than the depth of said groove by an amount such that when the filter is scewed onto its mounting stud 18, the body portion of said gasket is placed under vertical squeeze or compression to a degree ensuring an effective seal being created between the filter base plate and the engine block for all normal uses and/or operating conditions.

According to the FIGS. 2 and 3 form of sealing gasket 46 generally characterized as in the foregoing and which, incidentally, is that employed in the filter base-to-engine block sealing means shown in FIGS. 6A and 6B, such is shaped in transverse section so as to have a substantially semi-circularly crowned top surface 46a extending from the section body portion which is defined by parallel, vertically disposed walls 46b, 46c and a bottom wall 46d, and it is further provided with an integral, radially inwardly directed lip or flange 46l whose bottom line extends in continuation of the aforesaid bottom wall 46d. By design and as generally already stated, the vertical (axial) overall height of the ring body portion and its crowned upper surface is somewhat greater than the depth of the aforesaid groove 48, whereas the vertical distance from the upper face of the inwardly directed lip 46l to the upper line of the crowned top surface is somewhat less than the depth of the aforesaid groove 48; and the width of said section body portion is initially slightly greater than the width of said groove 48. Thus, when inserted in the groove throughout its full arcuate extent, the gasket 46 will secure itself in place by friction, and furthermore the inwardly directed lip 46l will underline the inner rib 48a of the two groove-defining ribs, and will furthermore make positive line contact therewith. Thus, when the filter is screwed as a unit onto the filter mounting stud 18, the inner groove-defining rib 48a will press the inwardly directed gasket flange or lip 46l against the top plane face of the raised boss-like portion of the engine block as in FIG. 6A, and also the body portion of the ring will be placed under an initial squeeze or compression which is sufficient to insure a low-pressure seal effective between the filter base plate and the engine block. Accordingly, the modified O-ring sealing gasket may properly be said to be double-acting in its sealing effect.

Analysis will further show that by virtue of the gasket 46 being provided with the aforesaid inwardly directed lip 46l, its area of contact with the plane top surface 34 of the engine block or casting thereon against which it bears is greatly increased as compared to that of the O-ring having conventional circular section according to the aforesaid application Serial No. 79,733, and thus a gasket shape as described is capable of providing a more efficient oil seal between the filter base plate and its cover plate and the engine block under the normal operating conditions than possible with the conventional O-ring shape of gasket for the same amount of threading-on movement of the filter.

Furthermore, the new gasket shape according to the instant invention provides a positive and effective filter-to-engine block seal under those adverse operating conditions causing axial deflection of the filter base plate away from the engine block, among which may be noted increase in oil pressure due to an oil line block on the outlet side of the filter, excessive vibration, shock or impact forces, etc. In explanation, when such deflection occurred in prior filter-engine block mountings using a flat lathe-cut gasket or sealing ring, the gasket lost its effectiveness since it permitted oil under pressure moving through the inwardly disposed oil chamber 32 to seep or leak outwardly through the crack developing between the filter base plate and the engine block surface. Contrastingly, and referring now to FIG. 6B, when such deflection occurs in a seal employing the modified O-ring gasket 46 according to the invention, the pressure oil becomes effective against the entire top surface of the gasket lip 46*l* and the adjacent inner side face of the gasket body proper and not only presses said lip more tightly against the engine block surface but also effects deformation of the gasket in radially outward direction so that it "flows" into any crack or space developing between the apex of the outer groove-defining rib 48*b* and the top plane surface 34 of the engine block, as is illustrated in FIG. 6B. Thus, rather than the oil seal being lost with base-plate deflection, as is the case with the flat lathe-cut gaskets, the modified O-ring gasket of the invention provides a seal whose effectiveness actually increases the greater the oil pressure effective thereon and is not impaired with base plate deflection.

Of course, it is to be understood that the degree of gasket deformation under oil pressure effective against its inner peripheral surface as aforesaid and its resultant increased sealing action will vary with the density and flow ability of the natural or synthetic rubber compound used in the fabrication of said gasket. It follows that the compound chosen will have the requisite compressive and flowability properties as to enable a gasket manufactured therefrom to satisfy the requirements and end purposes of the invention as explained in the foregoing.

FIGS. 4, 7A and 7B illustrate another modified O-ring gasket shape according to the invention. Such a modified gasket designated 56, like the gasket 46 of the prior described form, has a substantially semi-circularly crowned top portion 56*a* and a body portion defined sidewardly by divergent side wall portions 56*b*, 56*c*. By virtue of the divergence said side wall portions in conjunction with an inverted V-notch 56*d* sunk into its under or bottom wall, said body portion is formed with lips 56*e* and 56*f* extending along its lower inner- and outer-edge corners, which lips have V-section and are divergently disposed with respect to one another, thus to have a component of outward-inward extension from the gasket body portion. Furthermore, it will be appreciated that because of their divergence and yieldability, said lips will spread to a substantially horizontal position when the gasket is subjected to squeeze applied in axial direction.

The modified gasket according to FIG. 4 will be dimensioned in width so as to have press (friction) fit in the base plate groove 48 provided therefor and in axial direction so as to be compressed, i.e. placed under a vertical squeeze, when the filter is screwed to the mounting stud 18 with the number of turns designed to effect a spreading of the divergent lower edge lips 56*e*, 56*f* into the crack-like spaces between the apices of the groove-forming ribs 48*a*, 48*b* and the plane surface 34 of the engine block or its casting on which the filter mounts. Such will result in a double-acting, positive oil seal which is effective under the normal operating conditions of the filter and/or the automotive engine which it serves.

However, under abnormal operating conditions causing base plate deflection, as is intended to be illustrated in FIG. 7B, the oil pressure within the oil-flow space 32 becomes effective on the entire inner side face of the gasket 56 which is long because of its divergence, and particularly against the inner lip 56*e* which is flexible because it is backed only by the notch 56*d*, and causes the gasket to deform radially outwardly as in FIG. 7B into any crack developing between the outer rib 48*b* and the engine block surface, thus to positively seal off any oil leakage that would otherwise take place therethrough. Thus the modified gasket shape according to the FIG. 4 form is at least equally effective in providing an all-purpose, double-acting filter sealing gasket as that of the FIG. 3 form previously described.

FIG. 5, in conjunction with FIGS. 8A and 8B, illustrates yet another gasket of a shape which is also highly effective in achieving the aims and purposes of the invention. Such a gasket, which is designated 66, has a substantially semi-circularly crowned upper surface 66*a*, a similarly but oppositely crowned under surface 66*b*, an intermediate body portion which in section is shaped somewhat as an ellipse arranged with its major axis vertically disposed, and finally, an inwardly directed lip 66*l* which is disposed parallel to and is furthermore spaced a small distance above the horizontal bottom line of the gasket proper.

When the gasket is performing its normal sealing action as in FIG. 8A, the gasket lip 66*l* will make positive sealing contact with the engine plane surface 34 to which the filter mounts, which is additive to that provided by the gasket body portion which is of course placed under vertical squeeze between the bottom of its groove and said surface. However, upon the occurrence of base plate deflection in direction tending to make for oil leakage outwardly past the gasket, the latter is deformed in radially outward direction as is indicated in FIG. 8B, thus sealing off such leakage, with the deforming action being effectively assisted by the lip tending to curl under and move radially outwardly when subjected to oil pressure acting both from above and in radially outward direction. In addition, the lip 66*l* itself, by virtue of its thinness and hence relatively greater flexibility than the gasket-body portion, tends to be pressed tight against the engine-block top surface, thus in conjunction with the gasket body deforming or "flowing" into any crack forming below the apex of the outer groove-forming rib 48*b*, to provide a double-acting seal characterizing all forms of sealing gaskets according to the present invention.

As many changes could be made in carrying out the above constructions without departing from the scope of the invention, it is intended that all matter contained in the above description or shown in the accompanying drawings shall be interpreted as illustrative and not in a limiting sense.

I claim:

1. A screw-on throwaway type oil filter adapted to be screwed onto an engine block comprising a cylindrical casing open at one end, a base plate closing off said open end and provided with a central threaded outlet member for screwing onto an adaptor bushing of an engine, said outlet member forming a discharge opening, oil inlet means in said base plate disposed radially outwardly of said central opening, a cover plate secured to the outer surface of said base plate provided with circular, radially spaced, outwardly projecting ribs disposed radially outwardly of said inlet means for holding sealing means therebetween, and said sealing means comprising a resilient gasket having an axial dimension greater than the axial depth of said ribs and being defined by parallel, vertically disposed side walls, an arcuately crowned top wall and an arcuately crowned bottom wall, and said gasket having an integral radially inwardly extending, substantially flat circular lip disposed substantially adjacent the lower edge of the inner of said ribs, the lower end of said crowned bottom wall extending below said ribs, and coacting with said lip to utilize increased pressure of the oil entering through said inlet means to increase the effect of said sealing means against an engine block.

2. The oil filter of claim 1 wherein said lip is disposed above and in spaced relationship with said bottom wall of said sealing means.

3. An oil filter seal assembly for sealingly mounting a filter on an engine block, said seal assembly comprising a plane filter mounting surface on the engine block, a base on said filter, said filter base having inner and outer annular formations thereon with said formations together defining a downwardly-opening annular groove overlying said plane mounting surface, a sealing gasket including a body portion squeeze fitted in said groove and substantially filling said groove, said body portion extending downwardly therefrom toward said plane mounting surface, said gasket further having a lip integral with said body portion projecting radially inwardly therefrom and underlying the inner one of said formations, means to cause the downwardly extending portion of said body portion to normally bear with sealing pressure on said plane mounting surface and to normally confine said lip between said inner formation and said plane mounting surface, an oil flow passage radially inward of said annular formations and said gasket communicating said filter with said engine block, a portion of said gasket being composed of a resilient material deformable in response to the oil pressure in said oil flow passage on said body portion and said lip and further in response to deflection of the annular formations away from said plane mounting surface to substantially fill the space between said filter base and said plane mounting surface created by said deflection.

References Cited by the Examiner

UNITED STATES PATENTS

| | | | |
|---|---|---|---|
| 1,790,957 | 2/31 | Sykes | 277—169 |
| 2,537,249 | 1/51 | Walton | 285—354 X |
| 2,790,520 | 4/57 | Kuhn | 277—169 X |
| 2,795,439 | 6/57 | Smith | 285—199 X |
| 2,877,902 | 3/59 | Chase et al. | 210—440 |
| 2,884,133 | 4/59 | Walulik et al. | 210—136 |
| 2,889,183 | 6/59 | Peras | 277—169 |
| 2,968,501 | 1/61 | Tisch | 277—177 |
| 2,995,250 | 8/61 | Boewe et al. | |

REUBEN FRIEDMAN, *Primary Examiner.*

HERBERT L. MARTIN, *Examiner.*